United States Patent [19]
Tanaka et al.

[11] Patent Number: 5,978,595
[45] Date of Patent: Nov. 2, 1999

[54] METHOD FOR SUPPORTING USER OPERATION

[75] Inventors: Tadashi Tanaka, Yao; Mayumi Tamejima, Sakai; Hirotaka Mizuno; Akihiko Koga, both of Ikeda; Yoji Taniguchi, Suita; Masahiko Ogawa, Kyoto, all of Japan

[73] Assignee: Hitachi, Ltd., Tokyo, Japan

[21] Appl. No.: 08/938,784

[22] Filed: Sep. 26, 1997

[30] Foreign Application Priority Data

Sep. 27, 1996 [JP] Japan .................................. 8-277429

[51] Int. Cl.[6] .................... G06F 13/374; G06F 13/376
[52] U.S. Cl. ..................... 395/877; 345/336; 345/337; 345/338
[58] Field of Search ..................... 395/878, 872, 395/877, 850, 845, 200.53; 345/339, 336, 337, 338; 707/507; 380/4; 370/219; 364/188

[56] References Cited

U.S. PATENT DOCUMENTS

| | | | |
|---|---|---|---|
| 5,042,006 | 8/1991 | Flohrer | 345/337 |
| 5,117,458 | 5/1992 | Takaragi et al. | 380/4 |
| 5,388,198 | 2/1995 | Layman | 345/333 |
| 5,432,902 | 7/1995 | Matsumoto | 345/339 |
| 5,465,358 | 11/1995 | Blades et al. | 345/339 |
| 5,745,792 | 4/1998 | Jost | 395/878 |

FOREIGN PATENT DOCUMENTS

| | | |
|---|---|---|
| 62-57063 | 12/1987 | Japan . |
| 62-70870 | 3/1989 | Japan . |
| 2-24776 | 10/1990 | Japan . |
| 6-44283 | 2/1994 | Japan . |

*Primary Examiner*—Thomas C. Lee
*Assistant Examiner*—Mohamed Mashaal
*Attorney, Agent, or Firm*—Antonelli, Terry, Stout & Kraus, LLP

[57] ABSTRACT

A method of actively guiding and helping the user is disclosed, in which various supporting functions can be performed in accordance with a particular user situation. The method is equipped with user situation detection data having at least a user situation and a corresponding interaction pattern activated in such a user situation, supporting function select data having at least a user situation and a corresponding user supporting function name to be activated in the particular user situation, and at least one user supporting function. Each time an input is received from the user, the contents of the input are stored as an operation log data. The interaction pattern data of the user situation detection data is compared with the operation log data. If there is any coincident interaction pattern data, the supporting function select data is retrieved with the corresponding user situation data as a key, and the corresponding supporting function name is read, thereby activating the supporting function associated with the particular supporting function name.

6 Claims, 10 Drawing Sheets

| SCREEN ID | NORMAL VALUE | LONG VALUE |
|---|---|---|
| A | 30 | 60 |
| B | 20 | 40 |
| C | 20 | 40 |
| D | 40 | 60 |
| E | 50 | 90 |
| F | 40 | 60 |
| G | 90 | 120 |
| H | 90 | 120 |

| | OPERATION NAME (402) | OPERATION PROPERTY (404) | SCREEN ID (406) | REQUIRED TIME (408) |
|---|---|---|---|---|
| TIME POINT 2 → | RETURN | — | F | Short |
| | SELECT MENU | ITEM 4 | C | Short |
| | | — | G | Normal |
| | | | C | Normal |
| | | — | D | Normal |
| | | | C | Normal |
| | | | A | Normal |
| TIME POINT 1 → | NON-OPERATION | — | A | Long |

| USER SITUATION NAME (602) | SUPPORTING FUNCTION NAME (604) |
|---|---|
| GOAL NOT FORMED | AUTOMATIC DEMONSTRATION |
| FUNCTION UNSELECTABLE | OPERATION GUIDANCE |
| OPERATION SEQUENCE UNKNOWN | OPERATION DESCRIPTION |
| OPERATION DIFFICULT | OPERATION SUPPORT |

FIG.5

| READ NO. 501 | PATTERN NO. 502 | OPERATION NAME 504 | OPERATION PROPERTY 506 | SCREEN ID 508 | REQUIRED TIME 510 | USER SITUATION NAME 512 |
|---|---|---|---|---|---|---|
| 1 | 1 | | * | A | Short | GOAL NOT FORMED |
| 2 | 1 | | — | A | Long | |
| 3 | 1 | | — | * | * | |
| 4 | 2 | | * | C | Short | |
| 5 | 3 | | — | * | * | |
| 6 | 4 | | * | C | Normal | FUNCTION UNSELECTABLE |
| 7 | 1 | | — | C | Long | OPERATION SEQUENCE UNKNOWN |
| 8 | 1 | | — | * | Short | |
| 9 | 2 | * | * | * | * | |
| 10 | 3 | | — | * | * | |
| 11 | 1 | CORRECT | — | * | Normal | |
| 12 | 2 | KEY INPUT | * | C | Short | |
| 13 | 3 | | — | * | Normal | OPERATION DIFFICULT |

122

METHOD FOR SUPPORTING USER OPERATION

BACKGROUND OF THE INVENTION

The present invention relates to a method for supporting the user suffering from the difficulty of continuing to use an information service while monitoring the user operation of an information service system for supplying information services in compliance with a request from the user.

The following conventional methods are available for monitoring the user conditions and supplying a service to a user in response to a request made by key operation of the user to support the user as required.

Specifically, in the method of monitoring an automatic transaction system as described in JP-A-62-57063, the customer information is notified to a person in charge, who supports a customer in the case where the number of erroneous operations by the customer exceeds a predetermined reference number.

The automatic cash transaction system as described in JP-A-64-70870, on the other hand, switches the operating screen to the one for the novice in the case where the operation is discontinued for longer than a reference time and a stagnation is judged.

JP-A-2-247776, on the other hand, discloses an operation guiding method for the automatic transaction system, in which whether or not the user is accustomed to the operation is judged according to the time required for each operation, the number of operating errors, the number of transactions and the selective input by the user, and the user is supported, if required, by switching the operation guiding screen.

In the customer operation guiding system disclosed in JP-A-6-44283, a customer who is at a loss what to do can select an operating key interlocked with the window to receive an interactive support of the teller.

These methods find applications in such systems as ATM for automatically handling transactions in the financial world, etc., and have the main object of supporting the users who have no knowledge of the operation sequence.

In the financial and public service fields, in order to meet the ever increasing variety of needs from customers and citizens, an information service system is being introduced for fulfilling purposes of centralizing window functions at an increased number of strategic points. The information service system is installed in staffless shops and branches for handling various transactions and application procedures, supplying information, tele-consultations and other various services.

In keeping with an ever increasing variety of services supplied in these systems, the purposes of supporting the user are ramified. As to the services of transactions and receipt for application procedures, for example, as many sessions as possible can be desirably processed. This makes it necessary to support the user to complete each session within a short time. In many cases of information and tele-consultation services, on the other hand, the purposes of the user resorting to them are ambiguous, and therefore it is necessary to support the user to such an extent as to satisfy the user.

The conventional methods disclosed in JP-A-62-57063, JP-A-64-70870 and JP-A-2-247776, however, take into consideration only the description of the operation sequence as an object of supporting the user and fail to take any measure for supporting the user having an ambiguous object.

The customer operation guiding method disclosed in JP-A-6-44283 in which the teller participates, on the other hand, can offer the supporting work other than the operation guide constituting the main purpose. This method, however, makes it necessary for the user to select a key operatively interlocked with the teller, and poses the problem that this key is rarely depressed by users who are not accustomed to the operation.

SUMMARY OF THE INVENTION

The object of the present invention is to obviate the above-mentioned problems and to provide a method for actively guiding and helping the user in various ways according to the various user situations even in the absence of entry by the user desirous to receive a support.

In order to achieve the above-mentioned object, according to this invention, there is provided a method of actively guiding and helping the user in an information service system providing information services in response to a user request entered by way of an input/output device, comprising the steps of holding user situation detection data including a plurality of pairs of the user situations and the time-series interaction patterns, and support function select data including a plurality of pairs of the user situations and the user support functions to be activated for the respective user situations.

Each time an operating entry is received from the user or each time a state of non-operation is detected, the following processes (a) to (d) are performed:

(a) The contents of the operating entry or the state of non-operation are stored as the latest data thereby to update the time-series operation log data.

(b) The time-series interaction pattern of the user situation detection data is compared with the time-series operation log data, and if they coincide with each other, the user situation corresponding to the time-series interaction pattern is read.

(c) The supporting function select data are retrieved with the user situation thus read as a key, and the corresponding user supporting function name is read.

(d) The user supporting function associated with the user supporting function name thus read is activated.

A state of non-operation is detected in the case where any operating entry is not received from the user after the lapse of a predetermined time corresponding to the condition of the input/output device.

Also, the data on the time required for each operation is added to the time-series interaction pattern of each user situation detection data in the following-described manner.

In step (a) above, the time elapsed from the immediately preceding input or the immediately preceding detection of a state of non-operation to the current operating input is added as the contents of the operating input. Also, the time elapsed from the immediately preceding input or the immediately preceding detection of a state of non-operation to the detection of a state of non-operation is added as the contents of the state of non-operation. These data are stored as the latest data thereby to update the time-series operation log data.

In step (b) above, the above-mentioned time-series data are taken into consideration in comparing the time-series interaction pattern of the user situation detection data with the time-series operation log data.

In step (c) above, assume that there are a plurality of coincident time-series interaction patterns. An input area is displayed on the input/output device for selecting a specific one of a plurality of user situations, and the supporting function select data are retrieved with the selective input value of the user situation received in the input area as a key, and the corresponding user supporting function name is read.

Further, the user situation detection data and the supporting function select data include the following user situations (1) to (4):

(1) The goal of use is not formed.
(2) The goal of use is formed but the function for achieving the goal cannot be selected.
(3) The function could be selected, but the operation sequence is unknown.
(4) The operation sequence is known, but the particular operation is found difficult to carry out.

In order to meet these user situations, the following functions are activated:

In situation (1), a goal-making supporting function is activated for supplying information for helping the user form the goal.

In situation (2), a function select supporting function is activated for supplying information for helping the user select the function.

In situation (3), an operation sequence description supporting function is activated for supplying information on the operation sequence.

In situation (4), an operation supporting function is activated for helping the user operate.

The goal-making supporting function displays the description of the contents of the information service supplied on the input/output device even in the absence of an operating input from the user.

The function select supporting function displays on the input/output device the description of the contents of each function of the information services supplied and the input area for receiving the input as to whether this function is to be used.

The operation sequence description supporting function displays the description of the operation sequence on the input/output device.

The operation supporting function changes the display of the input receiving area to be input by the user to that for a novice.

BRIEF DESCRIPTION OF THE DRAWINGS

FIG. 4 is a data table showing an example of an operation log data 120 in FIG. 1.

FIG. 5 is a data table showing an example of a user situation detection data 122 in FIG. 1.

FIG. 6 is a data table showing an example of a supporting function select data 124 in FIG. 1.

DESCRIPTION OF THE PREFERRED EMBODIMENTS

An insurance information service system according to the present invention will be described in detail with reference to the accompanying drawings.

This system receives an information service request from the user and supplies the user with various insurance information services such as introduction of insurance commodities, a simulation agreement and a guide to the places of branches and ATM installation.

Figure 1:
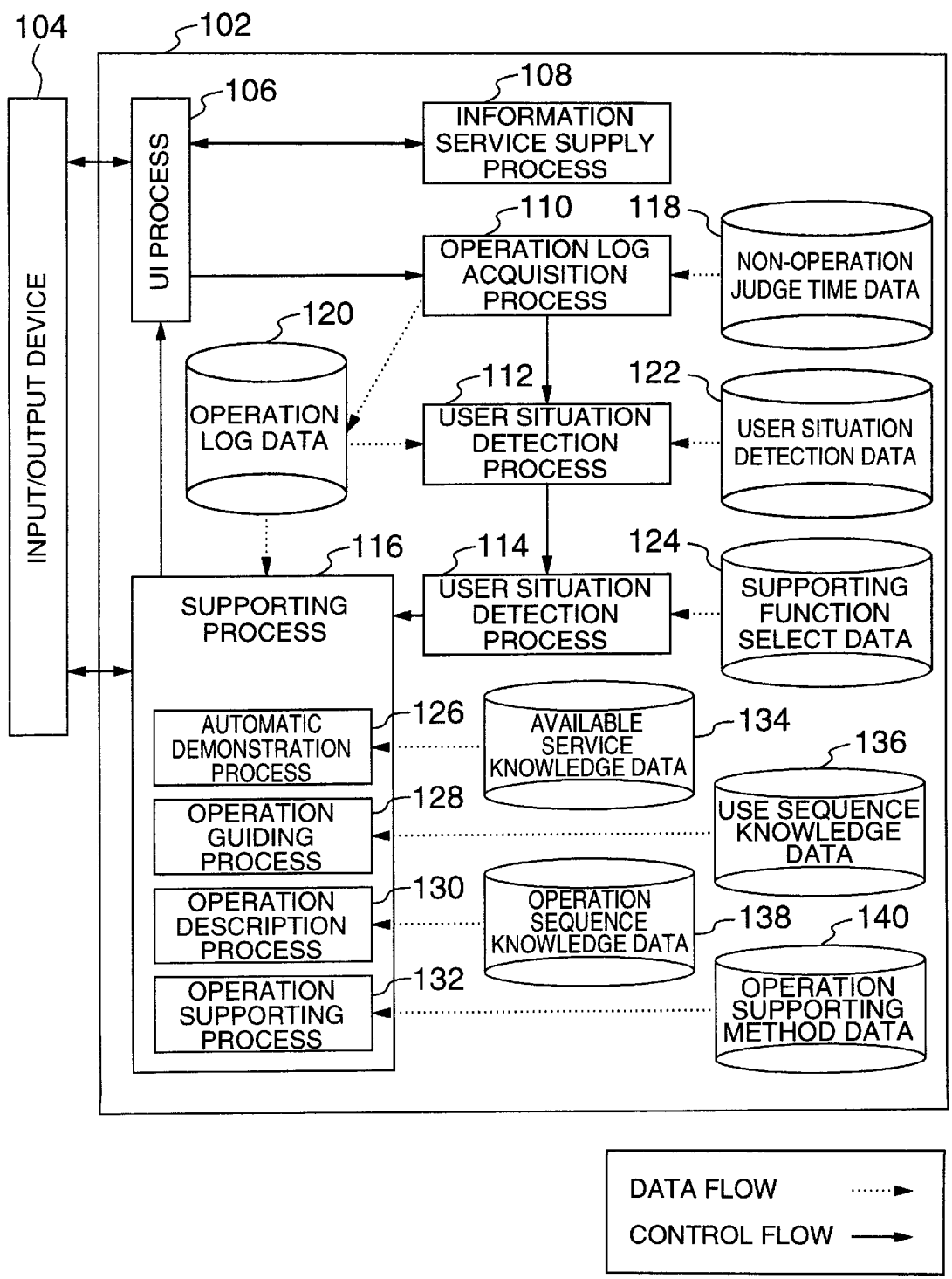
FIG. 1 is a diagram showing a configuration of an insurance information service system according to the present invention.

FIG. 1 is a diagram showing a general configuration of the system. An insurance information service system 102, upon receipt of an input from the user through an input/output device 104, executes a UI (user interface) process 106.

The UI process 106 notifies the received information service request to an information service supply process 108.

The information service providing process 108 displays the information service meeting the request on the input/output device 104 through the UI process 106.

In the above-mentioned way, the insurance information service system 102 supplies the information service meeting the request of the user.

The UI process 106 also transmits the contents of the received input to an operation log acquisition process 110.

The operation log acquisition process 110 updates an operation log data 120 based on the data thus transmitted thereto, and notifies a user situation detection process 112 that the operation log data 120 has been updated.

The operation log acquisition process 110 updates the operation log data 120 also when a state of non-operation by the user is judged with reference to a state of non-operation judge time data 118 indicating that no input operation is performed by the user, and notifies the user situation detection process 112 that the operation log data 120 is updated.

The user situation detection process 112 that has received the notification reads the operation log data 120 and the user situation detection data 122, compares them with each other, and if any of the data coincide with each other, notifies the corresponding user situation to a supporting function select process 114.

The supporting function select process 114 retrieves a supporting function select data 124, reads the supporting function name corresponding to the notified user situation, and notifies it to a supporting process 116.

The supporting process 116 notifies the activation of the supporting function to the UI process 106, and performs the supporting process corresponding to the supporting function name.

This system comprises an automatic demonstration process 126 for reading an existing service knowledge data 134 and displaying on the input/output device 104 a brief description of the services offered by the system as a user support, an operation guiding process 128 for reading a use sequence knowledge data 136 and an operation log data 120 and displaying a guidance conforming with the goal of use on the input/output device 104, an operation description process 130 for reading the operation sequence knowledge data 138 and the operation log data 120 and displaying the description on the operation sequence that can be performed at that particular time point on the input/output device 104, and an operation support process 132 for reading the operation supporting method data 140 and the operation log data 120 and changing the display on the input/output device 104 in such a manner as to facilitate the operation which has been difficult to execute.

Figures 2, 3:
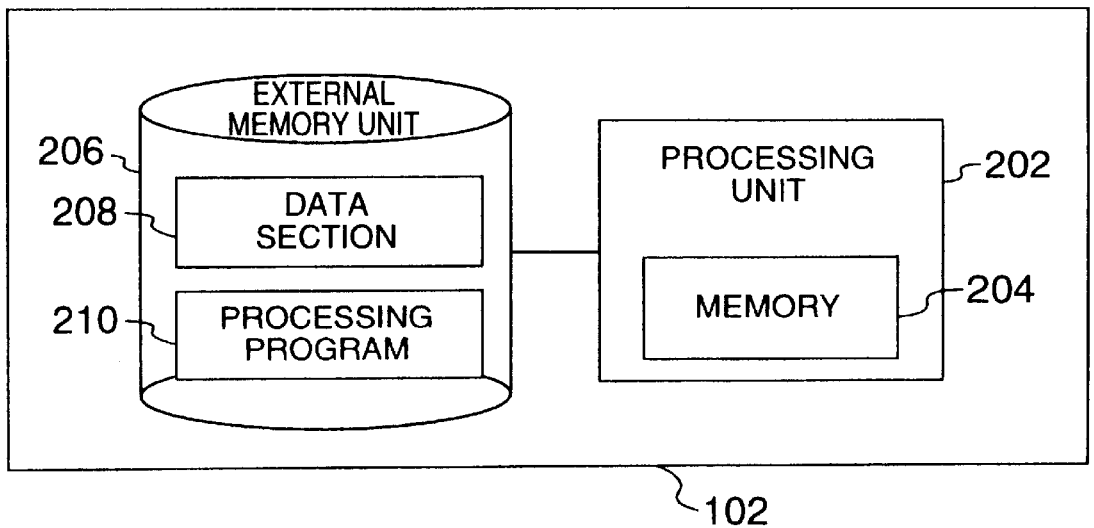
FIG. 2 is a diagram showing a configuration of an information processing system using an insurance information service system 102 in FIG. 1.
FIG. 3 is a data table showing an example of a state of non-operation judge time data 118 in FIG. 1.

FIG. 2 is a diagram showing a hardware configuration of an information process unit used for the insurance information service system 102.

A data section 208 of an external memory unit 206 has stored therein the non-operation judge time data 118, operation log data 120, the user situation detection data 122, the supporting function select data 124, the existing service knowledge data 134, the use sequence knowledge data 136, the operation sequence knowledge data 138 and the operation supporting method data 140.

On the other hand, the UI process 106, the information service providing process 108, the operation log acquisition process 110, the user situation detection process 112, the supporting function select process 114 and the supporting process 116 are stored in the external memory unit 206 as a processing program 210.

The functions provided by the insurance information service system 102 are realized by the processing unit 202 reading the data section 208 and the processing program 210 of the external memory unit 206 into the memory 204 and processing them.

FIG. 3 shows an example of the non-operation judge time data 118.

A screen ID 302 has stored therein a unique ID assigned to each screen displayed on the input/output device 104 by the insurance information service system 102.

A normal value 304 has stored therein a standard time required for the operation corresponding to each screen.

A long value 306 has stored therein a value for making a non-operation judgement for each screen.

FIG. 4 shows an example of the operation log data 120.

An operation name 402 has stored therein the name of the operation performed by the user.

In the case where the contents of operation cannot be specified by the operation name 402 alone such as "Select menu", a menu item or other data specifying the object of operation is stored in an operation property 404.

The screen ID 406 has stored therein the screen ID associated with a particular operation, and the required time 408 has stored therein the time required from the previous operation to the particular operation converted in terms of "Short", "Normal" or "Long" based on the value of the non-operation judge time data 118.

In the case where the required time is shorter than the normal value 304, the data value of the required time 408 of the operation log data 120 is set to "Short".

If the required time is longer than the normal value 304 and shorter than the long value 306, on the other hand, the data value of the required time 408 of the operation log data 120 is set to "Normal".

When the required time is longer than the long value 306, on the other hand, the data value of the required time 408 of the operation log data 120 is set to "Long".

Also, the topmost portion of FIG. 4 represents the latest data, and chronologically older data are stored progressively downward.

FIG. 5 shows an example of the user situation detection data 122. The data 122 has stored therein the interaction patterns corresponding to various user situations.

A read number 501 has stored therein the numbers representing the order of all data, and a pattern number 502 has stored therein the numbers representing the order of a given set of interaction patterns.

The interaction pattern data with the read number 501 of "1", for example, has a pattern number "1", and lacks the interaction pattern data of "2" and subsequent pattern numbers. Thus a set of interaction patterns is configured of the interaction pattern data of pattern number "1".

The four interaction pattern data with the read numbers 501 of "3" to "6" have pattern numbers "1" to "4" respectively, and constitute one set of interaction patterns.

The interaction pattern data having a larger pattern number 502 corresponds to the chronologically preceding operation.

The operation name 504, the operation property 506, the screen ID 508 and the required time 510 are portions of the interaction pattern, and are compared with the operation log data 120.

In the user situation name 512, the user situation corresponding to each existing interaction pattern data is stored in the data of the maximum number (the chronologically oldest data) in a set of interaction patterns.

In the case where the data value is "*", the coincidence is judged regardless of the value of the operation log data 120.

The data value "-" indicates that the data is null.

FIG. 6 shows an example of the supporting function select data 124.

The supporting function name 604 has stored therein the supporting function to be activated in association with the user situation name 602.

The process of active guidance and help according to this system will be described in detail below with reference to accompanying drawings.

Figure 7:
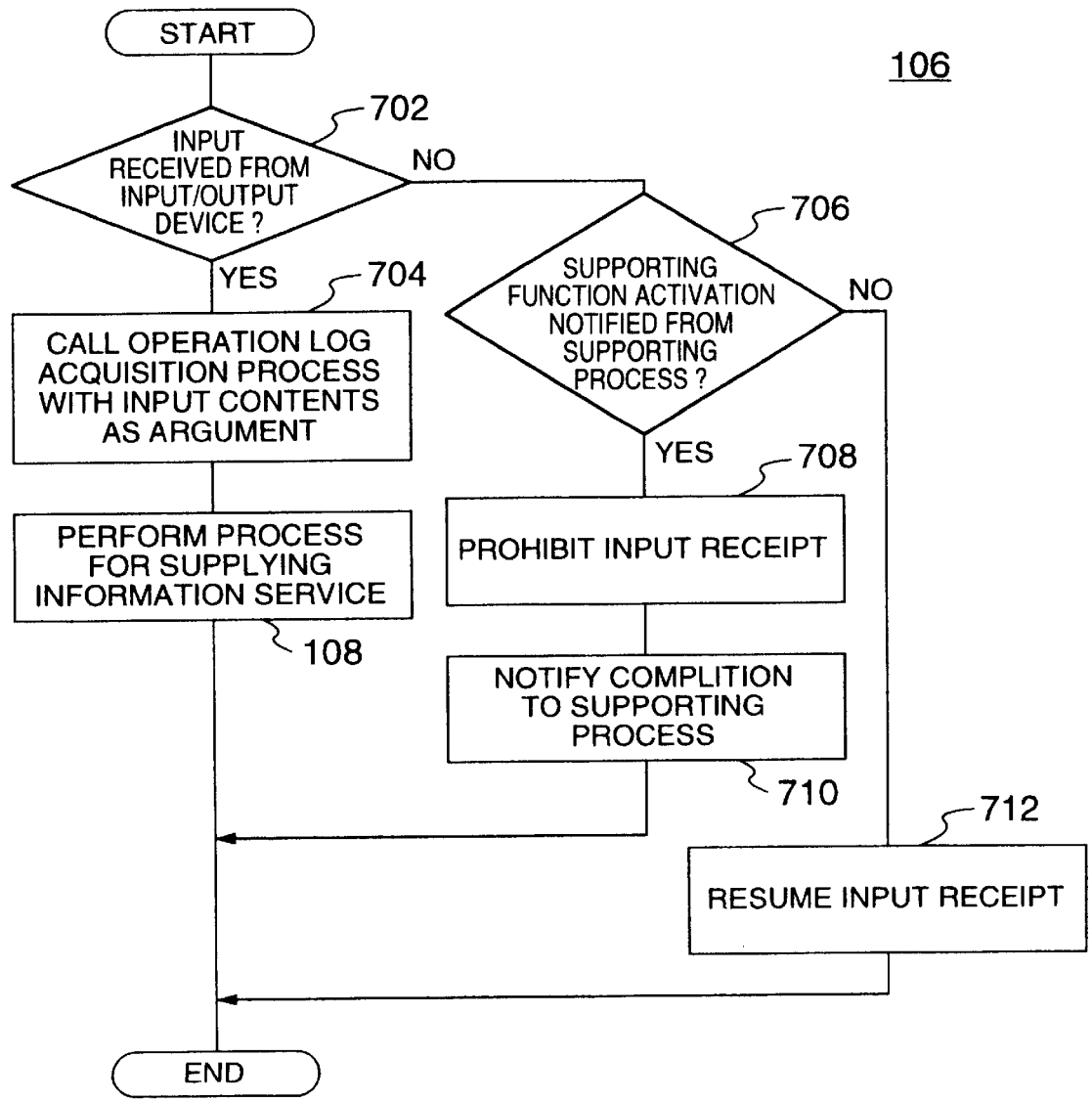
FIG. 7 is a flowchart of a UI process 106 shown in FIG. 1.
Figure 8:
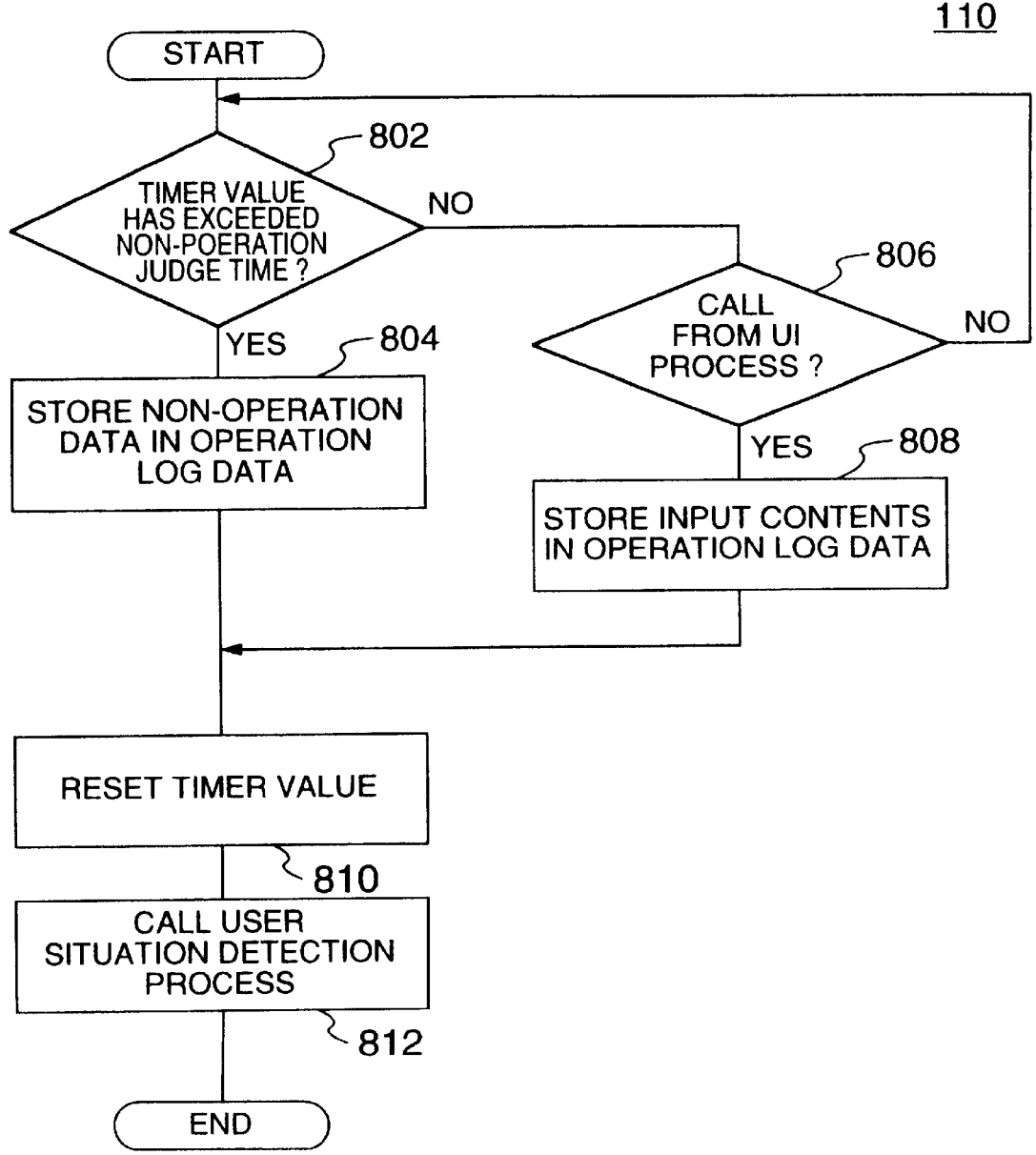
FIG. 8 is a flowchart of an operation log acquisition process 110 in FIG. 1.
Figure 9:
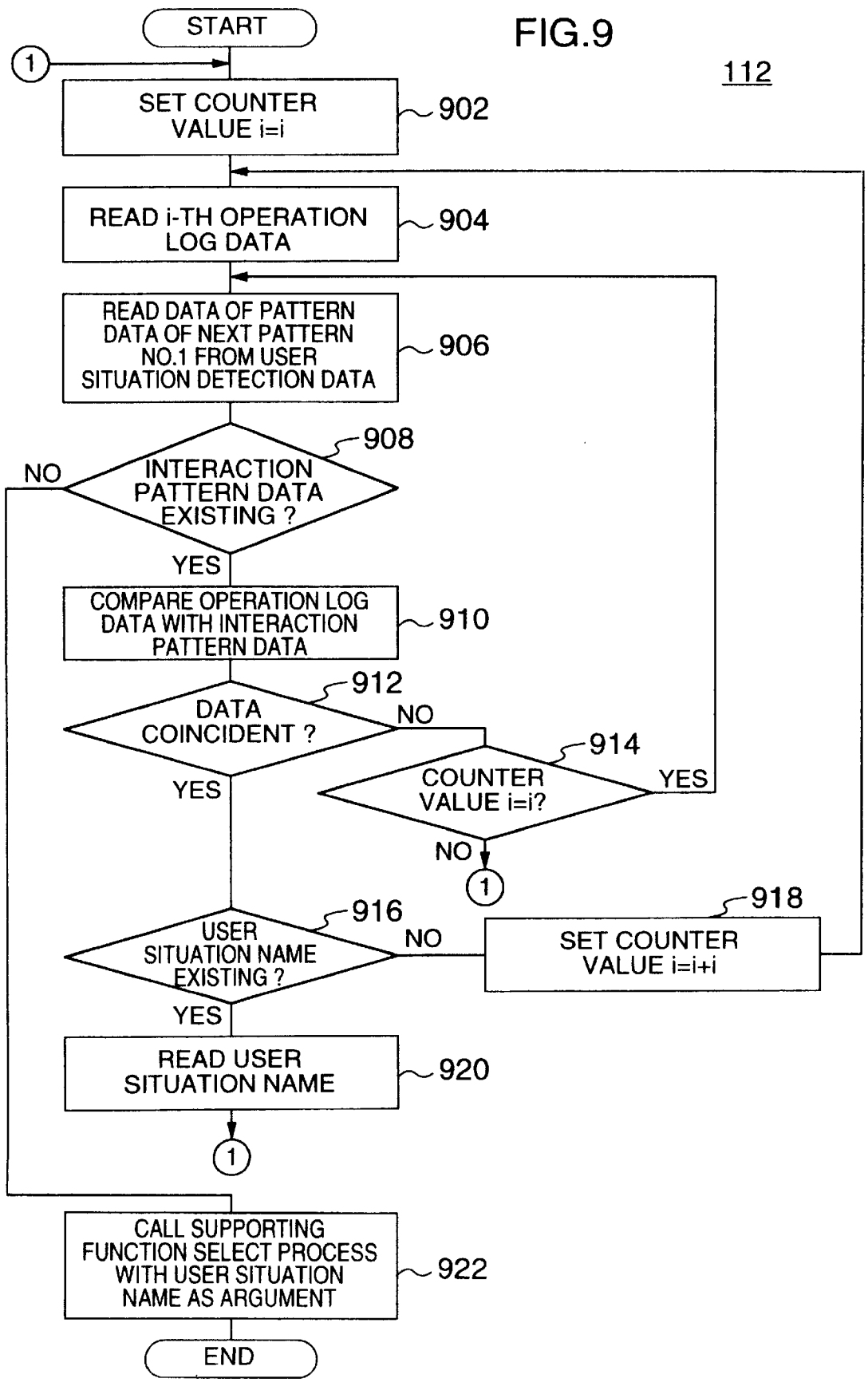
FIG. 9 is a flowchart of a user situation detection process 112 in FIG. 1.
Figure 10:
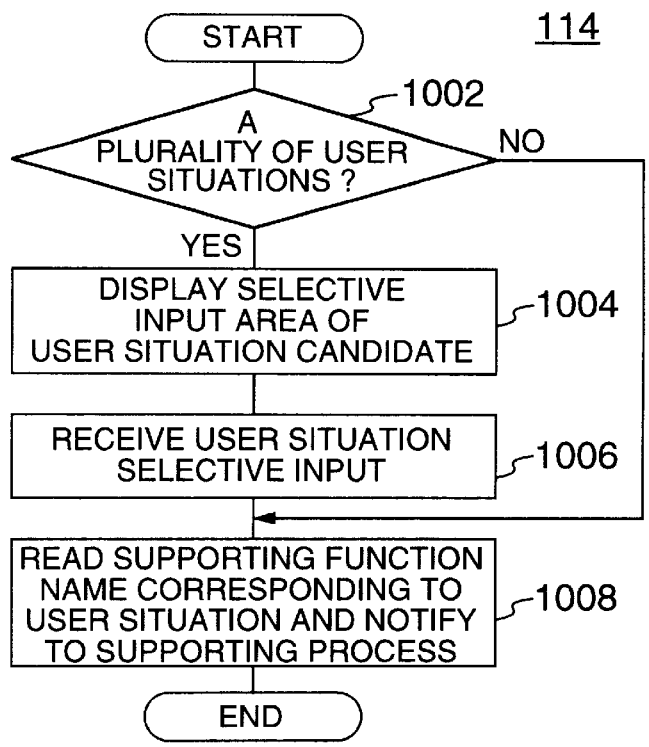
FIG. 10 is a flowchart of a supporting function select process 114 in FIG. 1.
Figure 11:
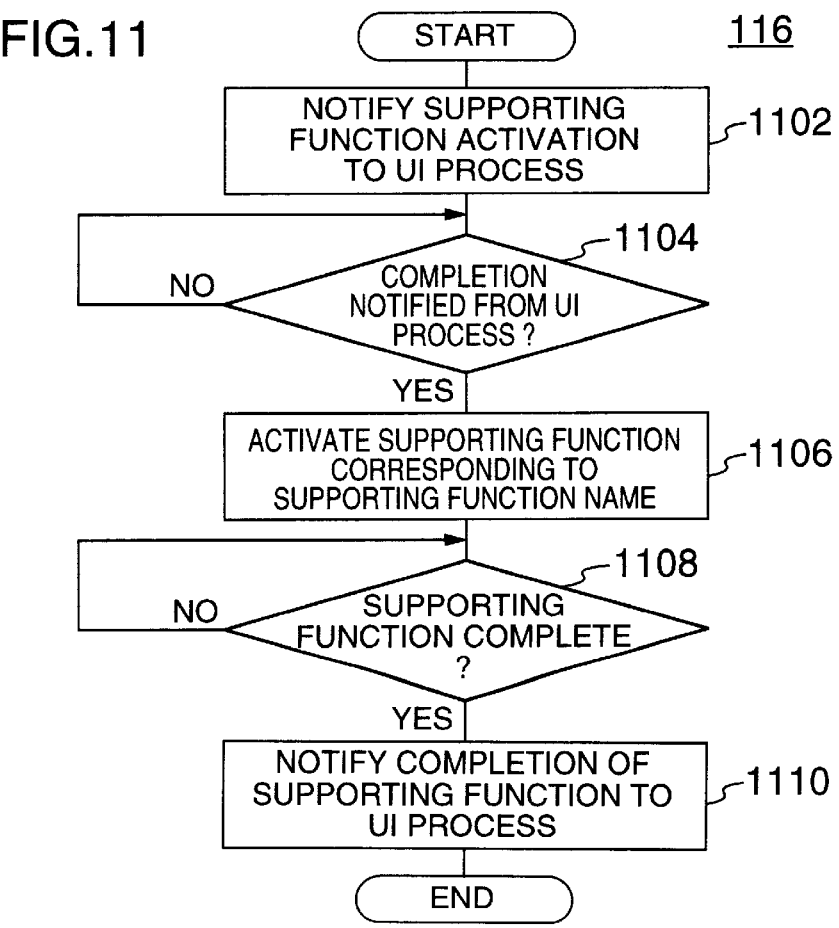
FIG. 11 is a flowchart of a supporting process 116 in FIG. 1.

FIG. 7 is a flowchart showing the processing flow of the UI process 106, FIG. 8 is a flowchart showing the processing flow of the operation log acquisition process 110, FIG. 9 is a flowchart showing the processing flow of the user situation detection process 112, FIG. 10 is a flowchart showing the processing flow of the supporting function select process 114, and FIG. 11 is a flowchart showing the processing flow of the supporting process 116.

Each of the above-mentioned drawings will be explained with reference to specific cases below, except for the operation log acquisition process 110 of FIG. 8 which will be explained only briefly.

The operation log acquisition process 110 is initiated with two motives. One is a call from the UI process (step 704 in FIG. 7), and the other is the lapse of a predetermined length of time (say, ten seconds) after the timer is reset in step 810.

With the start of the process, step 802 judges whether the timer value has exceeded the non-operation judge time (i.e., the long value 306 of the non-operation judge time 118 in FIG. 3). If the judgement is NO, step 806 judges whether there is a call from the UI process. If the judgement is NO, the process returns to step 802, while if the judgement is YES, the input data are stored in the operation log data in step 808. Then, the timer is reset in step 810, and the user situation detection process 112 of FIG. 9 is called in step 812.

In the case where the judgement in step 802 is YES, the non-operation data is stored in the operation log data in step 804, followed by executing steps 810, 812 described above.

Now, the processes 110 to 116 will be explained as a first specific example of the case involving time point 1 shown in the operation log data 120 of FIG. 4.

Time point 1 represents the case where the state of non-operation is continuing and has nothing to do with the UI process 106 of FIG. 7.

The operation log acquisition process 110 is started by the timer at predetermined time intervals without any call from the UI process 106 as described above.

As soon as the operation log acquisition process 110 starts, the timer value is compared with the long value 306 of the non-operation judge time data 118.

At time point 1, the time of the non-operation exceeds the long value 306 associated with the screen ID 302 of A (step 802), so that "non-operation, -, A, long" are stored as the operation log data as of time point 1 (step 804), the timer is reset (step 810), the user situation detection process 112 is called (step 812), and thus the operation log acquisition process 110 is completed.

Then, with the start of the user situation detection process 112 of FIG. 9, the counter value is initialized to "1" (step 902).

The first data "non-operation, -, A, long" at time point 1 are read from the operation log data 120 (step 904), followed by reading the interaction pattern data with the first pattern number 502 of "1", i.e., the data "select menu, *, A, short, goal not formed" with the read number 501 of "1" from the user situation detection 122 including a plurality of interaction pattern data (step 906).

The interaction pattern data thus read is existing (step 908), and therefore the operation log data read is compared with the interaction pattern data (step 910). Since data fail to coincide (step 912) and the counter value is "1" (step 914), the process returns to step 906.

The data with the next pattern number 502 of "1", i.e., the data "non-operation, -, A, long, goal not formed" with the read number 501 of "2" is read from the user situation detection data 122 (step 906).

Since the interaction pattern data to be read is existing (step 908), the operation log data that has been read is compared with the interaction pattern data (step 910). In this case, the data are coincident (step 912) and the user situation name "goal not formed" is existing (step 916), so that the user situation name "goal not formed" is read and the process returns to step 902.

After that, the user situation detection data 122 with the read number 501 of "3" and subsequent numbers are compared in similar fashion.

In the absence of coincident data and upon complete comparison of all the data, the data to be read are not present any longer (step 908). Therefore, the supporting function select process 114 is called with the user situation name "goal not formed" read as an argument (step 922), thereby completing the user situation detection process 112.

With the starting of the supporting function select process 114 of FIG. 10, the fact that the "goal not formed" is the only user situation name (step 1002) causes the user situation name 602 of the supporting function select data 124 to be retrieved with the user situation name "goal not formed" as a key, and the data value "automatic demonstration" of the corresponding supporting function name 604 is read and notified to the supporting process 116 (step 1008), thus completing the supporting function select process 114.

Then, as soon as the supporting process 116 of FIG. 11 starts, the activation of the supporting function is notified to the UI process 106 (step 1102), thus entering a state waiting for the notification of completion from the UI process 106 (step 1104).

Upon receipt of the notification, the UI process 106 of FIG. 7 is started. Since the activation of the supporting function is notified from the supporting process 116 (step 706) but the input is not received from the input/output device 104 (step 702), the receipt of the input from the input device 104 is prohibited (step 708), and the completion of the process is notified to the supporting process 116 (step 710), thus completing the UI process 106.

Upon receipt of the completion process notification from the UI process (step 1104), the supporting process 116 that has thus far been in waiting state activates the automatic demonstration process 126 corresponding to the supporting function name "automatic demonstration" (step 1106) and continues to wait until the completion of the supporting function. Upon completion of the automatic demonstration process (step 1108), the completion of the supporting function is notified to the UI process 106 (step 1110), thus completing the supporting process 116.

Upon receipt of the notification, the UI process 106 is started, the receipt of the input from the input device 104 is resumed (step 712) in view of the fact that the input is not received from the input/output device 104 (step 702) but the completion of the supporting function is notified from the supporting process 116 (step 706), thus completing the UI process 106.

As explained above, according to this method, a protracted state of non-operation on the initial menu screen A is detected at time point 1, and the "automatic demonstration" for meeting the situation "goal not formed" is initiated actively without any user request.

Figure 12:
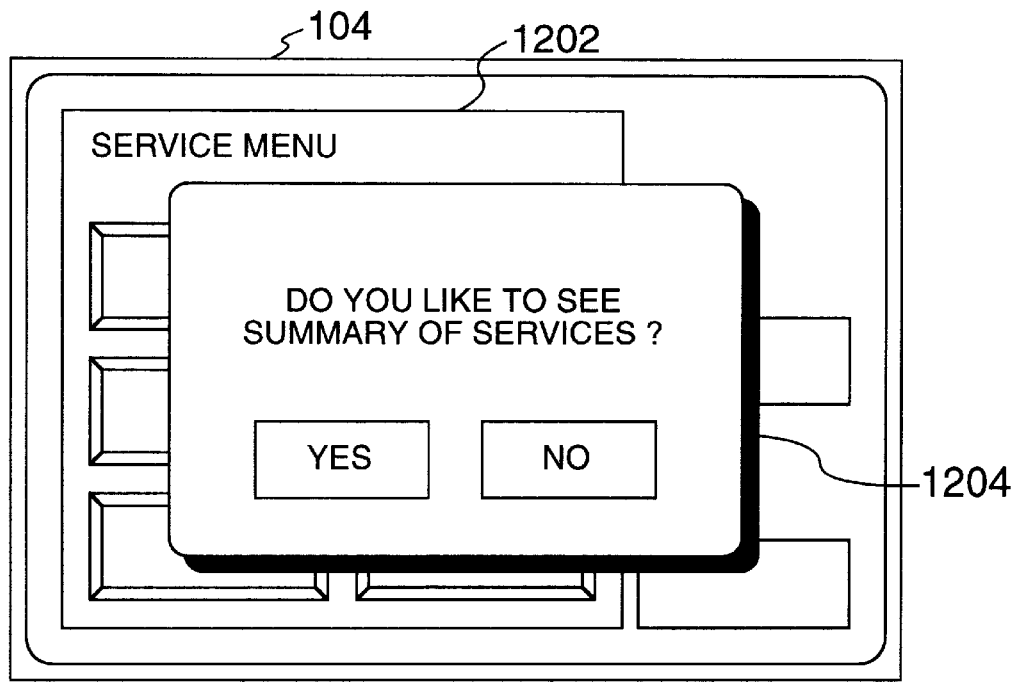
FIG. 12 shows an example of screen display at the time of activating an automatic demonstration function providing an example of the supporting functions.

FIG. 12 shows an example screen on which the automatic demonstration process 126 is started.

In screen A, a menu area 1202 for selecting a service is displayed.

Since the state of non-operation continues on this screen, a dialog box 1204 for seeking the activation of the automatic demonstration for briefly explaining the whole service is displayed.

In the case where the input of "YES" is received from the user, the available service knowledge data 134 is read and the contents of services are briefly displayed on the input/output device 104.

Now, an explanation will be given of a second specific example in which an operation input corresponding to time point 2 in FIG. 4 is received.

At time point 2, the operation input of "return" is received from the input/output device 104.

Assume that the contents of the input are, for example, "return", "screen F" and "required time of 20 sec".

In view of the fact that the input is received from the input/output device 104 (step 702), as soon as the UI process 106 starts, the operation log acquisition process 110 is called (step 704) with the input contents "return", "screen F" and "required time of 20 sec" as an argument, and the screen is returned to the immediately preceding one in response to the request "return" (step 108), thus completing the UI process 106.

With the start of the operation log acquisition process 110 called, the timer value remains at the same 20 sec as the required time, which is compared with the data value 60 sec with the screen ID 302 of F stored in the long value 306 of the non-operation judge time data 118.

In the case under consideration, the required time has not exceeds the long value 306 (step 802), a call is made from the UI process 106 (step 806), and the required time of 20 sec is shorter than the data value 40 sec of the normal value 304 of screen F of the non-operation judge data 118. Thus the input contents are stored as the operation log data "return -, F, short" (step 808), the timer is reset (step 810), and the user situation detection process 112 is called (step 812), thus completing the operation log acquisition process 110.

With the subsequent start of the user situation detection process of FIG. 9, the counter is initialized to value 1 (step 902) in the first place.

The first data "return, -, F, short" at time point 2 are read from the operation log data 120 (step 904), followed by reading from the user situation detection data 122 the interaction pattern data with the pattern number 502 of "1" in the first set of interaction patterns, i.e., the data "select menu, *, A, short, goal not formed" with the read number 501 of "1" (step 906).

Since the interaction pattern data to be read is existing (step 908), the operation log data read is compared with the interaction pattern data (step 910). In view of the fact that the data fail to coincide (step 912) and the counter value is "1" (step 914), the process returns to step 906.

The data with the pattern number 502 of "1" in the next set of interaction patterns, i.e., the data "non-operation, -, A, long, goal not formed" with the read number 501 of "2" are read from the user situation detection data 122 (step 906).

Since the read interaction pattern data is existent (step 908), the operation log data read is compared with the interaction pattern data (step 910). Since the data fail to coincident with each other (step 912) and the counter value is "1" (step 914), the process returns to step 906.

The data with the pattern number 502 of "1" in the next set of interaction patterns, i.e., the data "return, -, *, *" with the read number 501 of "3" are read from the user situation detection data 122 (step 906).

The interaction pattern data to be read is existing (step 908), and therefore the operation log data read is compared with the interaction pattern data (step 910). Since the data are coincident with each other (step 912) but the data value of the user situation name 412 is null (step 916), the counter is set to 2 (step 918), and the process returns to step 904.

The second data "select menu, item 4, C, short" at time point 2 are read from the operation log data 120 (step 904), and then the data with the next pattern number of "2" in the same set of interaction patterns, i.e., the data "select menu, *, C, short" with the read number 501 of "4" are read from the user situation detection data 122 (step 906).

The interaction pattern data to be read is existing (step 908), and therefore the operation log data read is compared with the interaction pattern data (step 910). Although the data are coincident with each other (step 912), the data value of the user situation 512 is null (step 916). Therefore, the counter value is set to "3" (step 918), followed by returning the process to step 904.

The third data "return, -, G, normal" at time point 2 are read from the operation log data 120 (step 904), and the data with the next pattern number of "3" in the same set of interaction patterns, i.e., the data "return, -, *, *" with the read number 501 of "5" are read from the user situation detection data 122 (step 906).

In view of the fact that the interaction pattern data to be read is existing (step 908), the operation log data read is compared with the interaction pattern data (step 910). Although the data are coincident with each other (step 912), the data value of the user situation name 512 is null (step 916).

Thus, with the counter value set to "4" (step 918), the process returns to step 904.

The fourth data "select menu, item 1, C, normal" at time point 2 are read from the operation log data 120 (step 904), and the data with the next pattern number of "4" in the same set of interaction patterns, i.e., the data "select menu, *, C, normal, function unselectable" with the read number 501 of "6" are read from the user situation detection data 122 (step 906).

In view of the fact that the interaction pattern data to be read is existing (step 908), the operation log data read is compared with the interaction pattern data (step 910). Since the data are coincident with each other (step 912) and the data value of the user situation name 512 is existing (step 916), the data value "function unselectable" is read (step 920), followed by proceeding to step 902.

In similar fashion, the data with the read number 501 of "7" and subsequent numbers are also compared and coincident with the set of interaction patterns "8" to "10", in the read number 501. Thus, the data value "operation sequence unknown" of the user situation name 512 is read, and the supporting function select process 114 is called with the "function unselectable" and "operation sequence unknown" as an argument (step 922), thus completing the user situation detection process 112.

With the start of the supporting function select process 114 shown in FIG. 10, the user situation names including "function unselectable" and "operation sequence unknown", which are the only two existing user situation names (step 1002), are used as user situation candidates, and an input area for selecting a specific one of them is displayed on the input/output unit 104 (step 1004).

Figure 13:
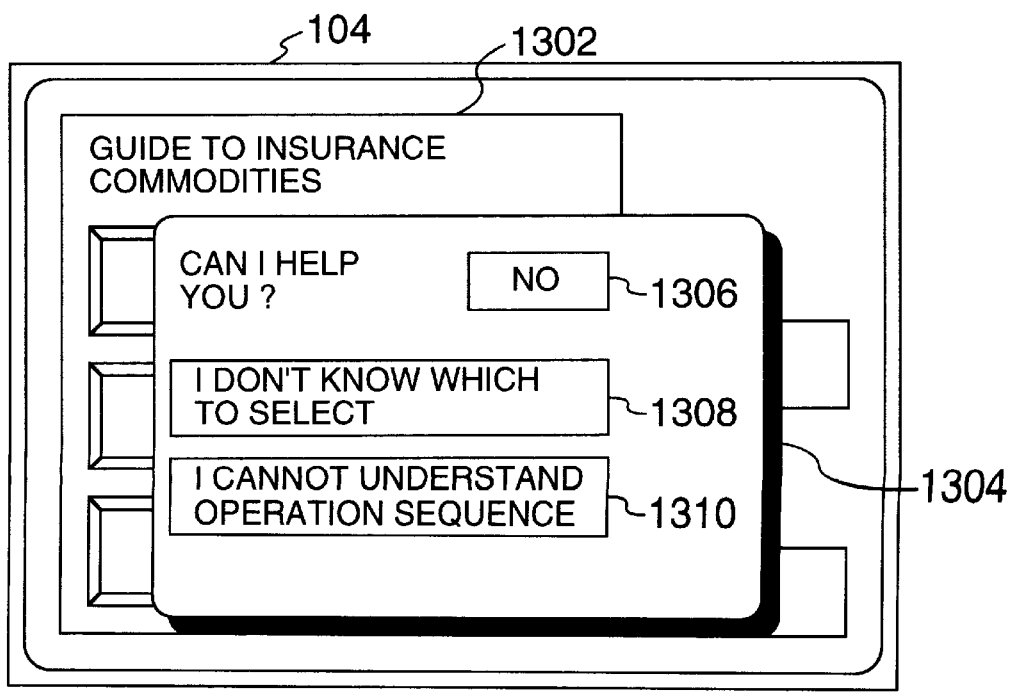
FIG. 13 shows an example of screen display at the time of receiving a user situation check input.

FIG. 13 shows an example screen for displaying a select input of the user situation.

A menu area 1302 is on display for permitting a desired insurance commodity to be selected. A user situation check dialog box 1304 is also on display.

The check dialog box 1304 includes an area 1308 for selectively inputting the "function unselectable" state, an area 1310 for selectively inputting the "operation sequence unknown" and an area 1306 for permitting the user not at a loss what to do to give an instruction for cancellation.

Explanation will be made below about a case in which an input is received at an area 1308 for selectively inputting the "function unselectable" state.

Once the "function unselectable" is received as a selective input of the user situation (step 1006), the user situation name 602 of the supporting function select data 124 is retrieved with the user situation value as a key, and the data value "operation guide" of the corresponding supporting function name 604 is read and notified to the supporting process 116 (step 1008), thus completing the supporting function select process 114.

Once the supporting process 116 is started, the activation of the supporting function is notified to the UI process 106 (step 1102), thereby entering the state of waiting for the completion notification from the UI process (step 1104).

Upon receipt of the notification, the UI process 106 is started, and the receipt of the input from the input device 104 is prohibited (step 708), in view of the fact that the input from the input/output device 104 is not received (step 702)

but the notification of the activation of the supporting function is received from the supporting process 116 (step 706). Thus the process completion is notified to the supporting process 116 (step 710), thus completing the UI process 106.

The supporting process 116 that has thus far been waiting, upon receipt of the completion process notification from the UI process (step 1104), activates the operation guiding process 128 corresponding to the supporting function name "operation guide" (step 1106), and continues to wait until the completion of the supporting function. Upon completion of the operation guiding process (step 1108), the completion of the supporting function is notified to the UI process 106 (step 1110), thereby completing the supporting process 116.

Upon receipt of the notification, the UI process 106 is started, and the receipt of the input from the input device 104 is resumed (step 712) in view of the fact that the input is not received from the input/output device 104 (step 702) but the notification of completion of the supporting function is received from the supporting process 116 (step 706), thus completing the UI process 106.

As described above, according to this method, at time point 2, two user situation candidates including "function unselectable" and "operation sequence unknown" are detected, and the selective input of one of the states is actively received from the user without any request for support from the user. The particular state thus selected is identified, and the "operation guide" for meeting the selected state is activated to support the user.

Figure 14:
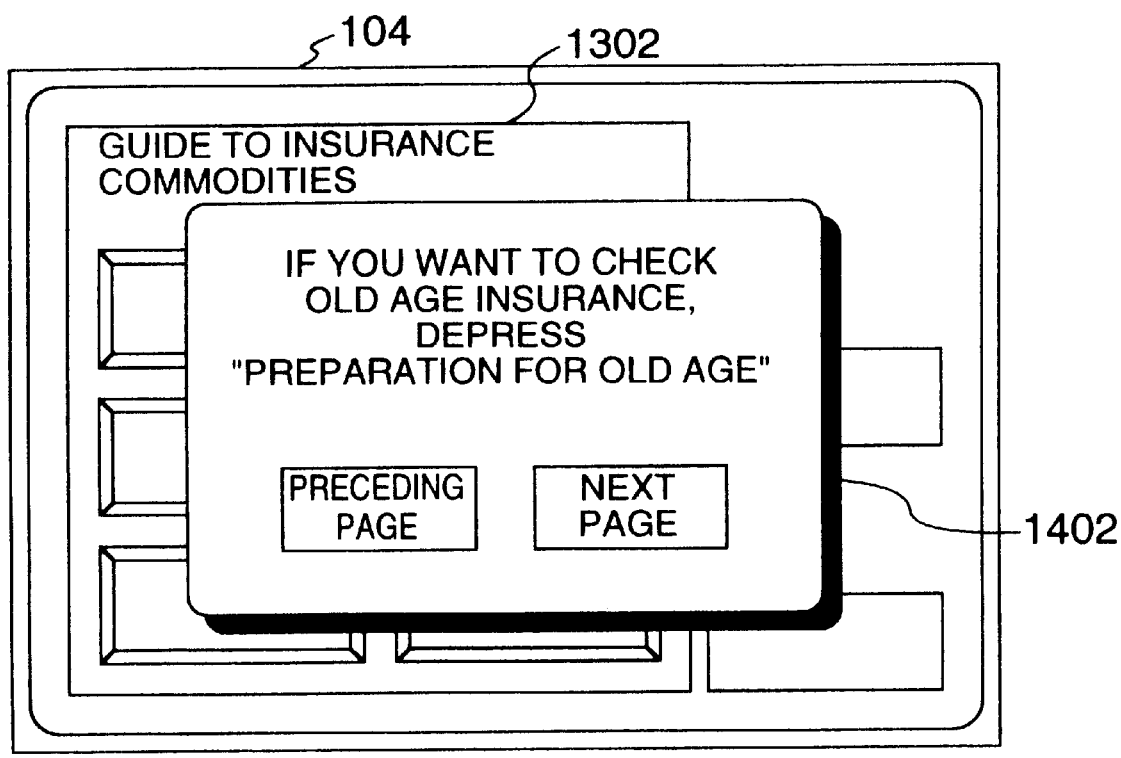
FIG. 14 shows an example of screen display at the time of activating an operation guiding function providing an example of the supporting functions.

FIG. 14 shows an example screen associated with the activation of the operation guiding function.

A menu area 1302 for selecting an insurance commodity is displayed as shown in FIG. 14.

The operation guiding process 128 reads the operation log data 120 and also the screen ID on display. The use sequence knowledge data 136 corresponding to the particular screen is further read thereby to display the guidance 1402.

The above-mentioned embodiments concern an insurance information service system for offering information services relating to the insurance. The invention, however, is not limited to such an application but is applicable with equal effect to other systems for providing information services.

According to this invention, even in the absence of user entry of the desire to be supported, various situations requiring the user support are detected and identified on the basis of the operations performed by the user to use the information services, and thus the user can be variously supported in accordance with the prevailing situation.

Also, even in the case where a plurality of user situations are detected and an appropriate one cannot be specified, various supports can be offered according to the prevailing situation in response to the selective input by the user.

Further, a support can also be offered to meet the need of a user who has not yet formed a goal, a user who cannot select the function for achieving his goal, a user who is at a loss what to operate, and a user who finds it difficult to execute the operation.

We claim:

1. A method of actively guiding and helping the user of an information service system for supplying information services in response to a request from the user by way of an input/output device, comprising the steps of:

(a) holding the user situation detection data having stored therein a plurality of pairs of user situations and time-series interaction patterns corresponding to the respective user situations, and supporting function select data having stored therein a plurality of pairs of said user situations and user supporting function names to be activated in said respective user situations;

(b) updating the time-series operation log data by storing the contents of the operation input or the state of non-operation as the latest data each time the operation input is received from the user or each time the state of non-operation is detected, respectively;

(c) comparing each time-series interaction pattern of the user situation detection data with each time-series operation log data, and upon coincidence between them, reading the user situation associated with said time-series interaction pattern;

(d) retrieving said supporting function select data with the user situation that has been read as a key and reading the corresponding user supporting function name; and (e) activating the user supporting function associated with said user supporting function name that has been read.

2. A method of actively guiding and helping the user according to claim 1, wherein said state of non-operation is detected when the operation input from the user is not received before the lapse of a predetermined length of time in accordance with the condition of said input/output device.

3. A method of actively guiding and helping the user according to claim 1, wherein required time data for each operation is added to each data of the time-series interaction pattern of said user situation detection data;

said step (b) includes the step of adding the elapsed time from the immediately preceding input or the immediately preceding detection of a state of non-operation to the contents of said operation input, adding the elapsed time from the immediately preceding input or the immediately preceding detection of a state of non-operation to the present detection of a state of non-operation to the contents of said state of non-operation data, and updating the time-series operation log data by storing said added data as the latest data; and said step (c) includes the step of comparing the time-series interaction pattern of said user situation detection data with said time-series operation log data including said time data.

4. A method of actively guiding and helping the user according to claim 1, wherein:

said step (d) includes the step of displaying on the input/output device an input area for permitting selected one of a plurality of user situations to be selected in the case where a plurality of time-series interaction patterns are coincident with each other, and reading the appropriate user supporting function name by retrieving said supporting function select data by way of the selective input value of the user situation received in said input area.

5. A method of actively guiding and helping the user according to claim 1, wherein the user situations included in said user situation detection data and said supporting function select data include:

(1) the state in which the goal of use is not formed,
(2) the goal is formed but the function for achieving the goal cannot be selected,
(3) the function can be selected but the operation sequence is unknown, and
(4) the operation sequence is known, but the operation is difficult to execute;

the goal-forming supporting function is activated for supplying information to help the user form the goal in the user situation (1), the function select supporting function is activated for supplying information to help the user select the function in the user situation (2), the operation sequence descriptive supporting function is activated for supplying the information on the operation sequence in the user situation (3), and the operation supporting function for supporting the user operation is activated in the user situation (4).

6. A method of actively guiding and helping the user according to claim 5, wherein:

said goal-forming supporting function includes the step of displaying on said input/output device the description of the contents of the information service supplied, without any operation input from the user;

said function select supporting function includes the step of displaying on said input/output device the description of the contents of the various functions of the information services supplied and an input area for receiving the input as to the desire to use each of said functions;

said operation sequence descriptive supporting function displays the description of the operation sequence on said input/output device; and said operation supporting function includes the step of switching the display of the input receiving area for the operation to be performed by the user to a display easily understandable by a novice.

* * * * *